May 17, 1960     R. D. PORTER ET AL     2,936,584
POSITIVE FEEDBACK ABATEMENT MEANS
Filed Dec. 31, 1958
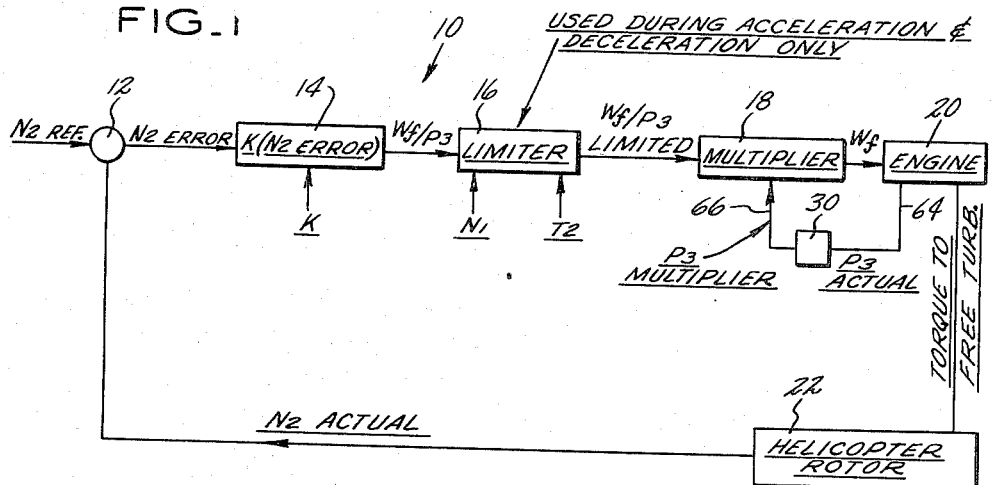
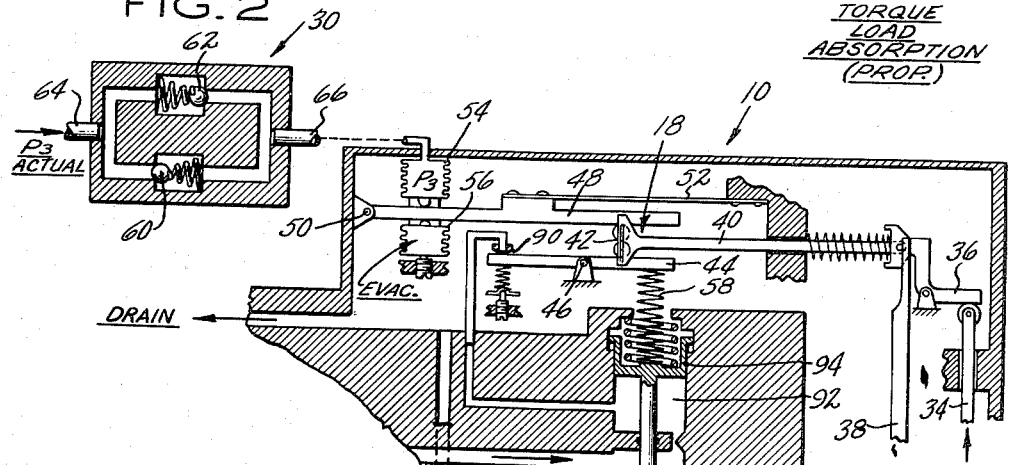
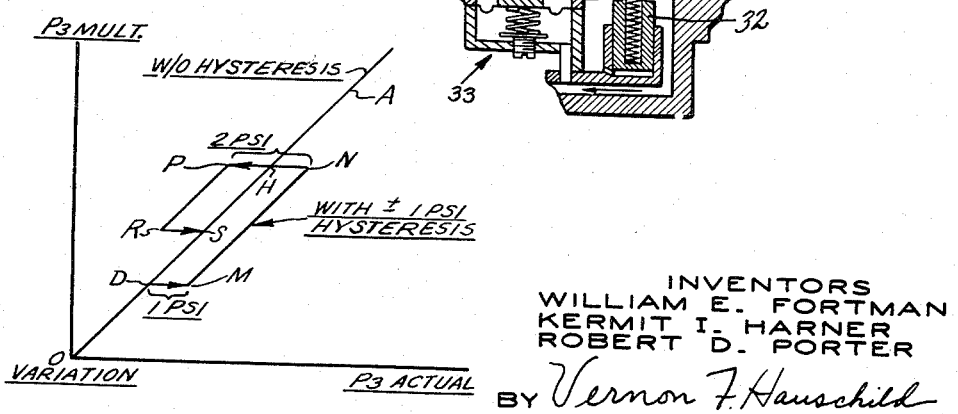
INVENTORS
WILLIAM E. FORTMAN
KERMIT I. HARNER
ROBERT D. PORTER
BY Vernon F. Hauschild
ATTORNEY

United States Patent Office 2,936,584
Patented May 17, 1960

2,936,584

POSITIVE FEEDBACK ABATEMENT MEANS

Robert D. Porter, Simsbury, Kermit I. Harner, Windsor, and William E. Fortmann, West Hartford, Conn., assignors to United Aircraft Corporation, East Hartford, Conn., a corporation of Delaware Application December 31, 1958, Serial No. 784,351

9 Claims. (Cl. 60—39.28)

This invention relates to fluid control systems and more particularly to means for abating the effects of positive feedback therein.

It is an object of this invention to teach positive feedback abatement means comprising apparatus preventing the transmission of signal changes, such as a parameter change, in a positive feedback system when the signal change is below a preselected limit while transmitting large signal changes quite accurately.

It is a further object of this invention to teach constant speed powerplant fuel control means comprising a force balance multiplier which is actuated by the signal from two variables, one of which is powerplant output or speed, including a powerplant output or speed feedback from the powerplant to the fuel control means in positive feedback relationship, with provisions for preventing transmitting signal changes responsive to powerplant output or speed changes to the multiplier when the changes are below a preselected limit while transmitting these changes quite accurately when the changes are substantial.

Other objects and advantages will be apparent from the specification and claims, and from the accompanying drawings which illustrate an embodiment of the invention.

Fig. 1 is a diagrammatic representation of a fluid control means, preferably a fuel control, utilizing our invention.

Fig. 2 is a fragmentary showing of a fluid control means, preferably a fuel control, illustrating a preferred embodiment of our invention.

Fig. 3 is a graphic representation of the affect of our invention upon signal transmission.

Our invention is intended for use primarily in a fuel control system for a free turbine engine, which free turbine is driven by the exhaust gases from a gas generator or the turbojet or main engine turbine and which in turn may drive a helicopter rotor, a turboprop engine propeller, or the like. It is the main function of the fuel control to control the free turbine and hence, for example, the helicopter rotor, at a constant speed designated as $N_2$. Our fuel control regulates the rate of fuel flow, $W_f$, to the engine thereby controlling the engine output so as to maintain speed $N_2$ constant. If free turbine speed $N_2$ falls below the selected or reference speed $N_2$, our fuel control increases the rate of fuel flow $W_f$ to the engine to increase free turbine speed $N_2$, and vice versa.

A brief description of the fuel control embodying our invention will be given herein and greater particulars with respect thereto may be found in U.S. Patent Nos. 2,854,818, 2,857,741, 2,909,895, and 2,923,128 and the environment will be shown generally in U.S. Patent No. 2,811,324, to which reference may be had.

A definite relationship exists between free turbine speed $N_2$ or the error therein and the jet engine parameter $$\frac{W_f}{P_3}$$

where $W_f$ represents fuel flow to the jet engine, which is preferably of the axially aligned compressor, burner and turbine type described in U.S. Patent Nos. 2,711,631 and 2,747,367, and $P_3$ represents compressor discharge pressure of the jet engine compressor and, further, $P_3$ is indicative of jet engine power output or speed. Utilizing this information, our fuel control performs its $N_2$ control function by utilizing engine parameters to perform the calculation $$\left(\frac{W_f}{P_3} \text{ reference}\right) \times (P_3 \text{ actual}) = (W_f \text{ actual})$$

Referring to Fig. 1 we see a diagrammatic representation of the fuel flow control 10 utilizing our invention. The desired free turbine speed $N_2$ reference is compared or algebraically added to $N_2$ actual at station 12, $N_2$ actual being transmitted thereto from the helicopter rotor, to determine $N_2$ error. $N_2$ error is transmitted to station 14 where it is multiplied by a constant K to calculate the parameter $$\left(\frac{W_f}{P_3} \text{ reference}\right)$$

which bears a direct relationship to $N_2$ error and is chosen in preference to $W_f$, since it has a more limited range. Due to considerations such as engine surge, engine turbine over-temperature, and combustion chamber flame blowout, it is necessary to establish maximum and minimum $$\frac{W_f}{P_3}$$

limits and such is accomplished by passing parameter $$\left(\frac{W_f}{P_3} \text{ reference}\right)$$

through station 16 where it is acted upon by jet engine parameter $T_2$ (compressor inlet temperature) and $N_1$ (jet engine turbine speed), to establish these maximum and minimum $$\frac{W_f}{P_3}$$

limits so that the parameter $$\left(\frac{W_f}{P_3} \text{ limited}\right)$$

is transmitted from station 16 to multiplier station 18. At station 18, the parameter $$\left(\frac{W_f}{P_3} \text{ limited}\right)$$

is multiplied by ($P_3$ actual) which is transmitted to station 18 by engine 20, to produce the product ($W_f$ actual), which product is used to regulate fuel flow to engine 20 to drive the free turbine of engine 20 at speed $N_2$. The free turbine of engine 20 is connected directly to helicopter rotor 22 to drive helicopter rotor 22 at speed $N_2$ so that helicopter rotor 22 absorbs the torque of the free turbine of jet engine 20. The speed of the free turbine of engine 20 and hense the speed of helicopter rotor 22, ($N_2$ actual) is transmitted from helicopter rotor 22 to station 12.

It will be noted that station 16, which sends a first signal to multiplier 18 and engine 20 which sends a second signal to multiplier 18 will so connect to multiplier 18 that a change in first signal $$\left(\frac{W_f}{P_3} \text{ limited}\right)$$

sent to multiplier 18 by station 16 will increase the product ($W_f$ actual) in the same direction as the first signal change. The change in the product ($W_f$ actual) will cause a change in the fuel being provided to engine 20 in this same direction and hence a change in this same direction in the power output of engine 20 so that the ($P_3$ actual) signal sent from engine 20 to multiplier 18 will be changed in this same direction and will cause a second change in the product of multiplier 18 in this same direction. This continued buildup of changes in the same direction, whether increasing or decreasing, is known as a positive feedback system and will tend to introduce instability into the system unless abated in some fashion.

It is the purpose of our invention to abate this positive feedback system and such will be accomplished by incorporating mechanism at point 30 in the line transmitting the ($P_3$ actual) signal from engine 20 to multiplier 18 which will prevent transmission of changes in ($P_3$ actual) signal from engine 20 to multiplier 18 when the ($P_3$ actual) signal change is below a preselected limit and which will quite accurately transmit ($P_3$ actual) signal changes from engine 20 to multiplier 18 when the ($P_3$ actual) signal changes are above this preselected limit. In practice, ($P_3$ actual) signal will be transmitted from engine 20 to multiplier 18 with a fixed error equal to the preselected limit. In this fashion, fuel control unit 10 will not be hampered by positive feedback when the changes in ($P_3$ actual) are small yet will be capable of accurately transmitting large ($P_3$ actual) changes.

For purposes of description, the signal transmitted from station 30 of Fig. 1 to multiplier 18 will be designated as ($P_3$ mutiplier) and its relation to the ($P_3$ actual) signal being sent from station 20 to station 30 is illustrated in the Fig. 3 graph.

Referring to the Fig. 3 graph we will see how the installation of the proposed mechanism at station 30 of Fig. 1 introduces a hysteresis effect into the ($P_3$ actual) signal being transmitted from engine 20 to multiplier 18 as a ($P_3$ multiplier) signal. Hysteresis, as used herein, may be likened to backlash in gears, and will now be described. Let us assume that it is our objective to prevent the transmission of ($P_3$ actual) signal changes from engine 20 to multiplier 18 when the ($P_3$ actual) signal change is below one (1) p.s.i. If engine 20 were connected directly to multiplier 18, the ($P_3$ actual) signal would equal the ($P_3$ multiplier) signal so that a plot of ($P_3$ actual) vs. ($P_3$ multiplier) would follow along line A of Fig. 3. Since there is no difference between ($P_3$ actual) and ($P_3$ multiplier) in the assumed direct connection, plot line A of Fig. 3 may be said to be without hysteresis.

If a one (1) p.s.i. hysteresis effect is imparted to our system, ($P_3$ actual) pressure will move from point D to point M before any change is encountered in ($P_3$ multiplier). As ($P_3$ actual) increases further, ($P_3$ multiplier) will move from point M to point N, at a rate or slope common with curve A. If at point N, ($P_3$ actual) is now reduced and if we assume a precise one (1) p.s.i. hysteresis system, our plot will move between points N and point H without change in ($P_3$ multiplier) and a further reduction in ($P_3$ actual) will cause our plot to move along H—D with reduction in ($P_3$ multiplier) at the slope of curve A. If a two (2) p.s.i. hysteresis rate was used in our system, when ($P_3$ actual) was reduced from point N there would be no change in ($P_3$ multiplier) to point P and further reduction in ($P_3$ actual) would cause our plot to move along line P—R, at which point ($P_3$ actual) could move from point R to point S without increase in ($P_3$ multiplier). In this fashion it will be noted that small changes, that is changes below a preselected limit, in ($P_3$ actual) have no effect upon ($P_3$ multiplier) but that a change in ($P_3$ actual) in excess of the preselected limit will be transmitted accurately, diminished by the amount of the preselected limit, as ($P_3$ multiplier) pressure. For example, assume that at point D in Fig. 3, ($P_3$ actual) and ($P_3$ multiplier) are both 60 p.s.i. At point M, ($P_3$ actual) will be 61 p.s.i while ($P_3$ multiplier) remains 60 p.s.i. At point N, ($P_3$ actual) will have increased to 70 p.s.i. while ($P_3$ multiplier) will be at 69 p.s.i At point P, ($P_3$ actual) will be at 68 p.s.i. while ($P_3$ multiplier) remains at 69 p.s.i. and at point R, ($P_3$ actual) will be at 64 p.s.i while ($P_3$ multiplier) will remain at 65 p.s.i. and at point S, ($P_3$ actual) and ($P_3$ multiplier) will both be at 65 p.s.i Apparatus for accomplishing our positive feedback abatement function through a hysteresis effect is shown in Fig. 2. Fuel control 10 comprises throttle valve 32 which is positioned by force motion multiplier 18 as a function of the product $$\left(\frac{W_f}{P_3}\text{ limited}\right)$$

transmitted thereto by movable rod 34 which actuates bell crank 36 as a function of $$\left(\frac{W_f}{P_3}\text{ reference}\right)$$

as limited by shaft 38 to the parameter $$\left(\frac{W_f}{P_3}\text{ limited}\right)$$

This last-recited parameter positions bar 40 which carries rolling fulcrum 42 thereon. Rolling fulcrum 42 contacts beam 44 which is pivotable about point 46 and further contacts beam 48 which is pivotable about point 50 and which is held in contact with rolling pivot point 42 by stationary spring 52. The translatory motion imparted to bar 40 as a function of $$\left(\frac{W_f}{P_3}\text{ limited}\right)$$

in the fashion just described establishes a pressure point on beam 44 at a precise distance from fulcrum point 46. Force is applied at this established pressure point 42 on beam 44 by the action of opposed bellows 54 and 56, which are subjected to ($P_3$ multiplier) pressure and a vacuum respectively, so that a force proportional to the product of or moment established by the force of the opposed bellows 54 and 56 through beam 48 against beam 44 and the distance between points 42 and 46 on beam 44 is transmitted by multiplier 18 to beam 44, thereby varying the area of bleed jet 90 and hence the pressure in chamber 92 to establish the area of throttle valve 32. The pressure drop across throttle valve 32 is maintained constant by diaphragm-actuated by-pass valve means 33 so that the rate of fuel flow therethrough ($W_f$ actual) is a direct function of the position of or area of throttle valve 32, which position or area is determined by the product $$\left(\frac{W_f}{P_3}\text{ limited}\right)\times(P_3\text{ multiplier})$$

The hysteresis or positive feedback abatement apparatus is incorporated into control 10 in Fig. 2 by the incorporation of back-to-back check valves 60 and 62 which are positioned in parallel at station 30 between line 64 which connects engine 20 to station 30 and line 66 which connects station 30 to multiplier 18. Check valves 60 and 62, if they are to correspond to the Fig. 3 illustration, are set to open when the pressure drop thereacross is at or exceeds one (1) p.s.i. so that until the ($P_3$ actual) pressure in line 64 exceeds one (1) p.s.i., no ($P_3$ multiplier) pressure is transmitted through line 66 to bellows 54. In similar fashion, when ($P_3$ actual) pressure in line 64 is static at 60 p.s.i., and the system is in equilibrium so that the pressure in line 66 is also 60 p.s.i., the ($P_3$ actual) signal must increase above 61 p.s.i. before check valve 60 will open to permit transmission of pressure from line 64 into line 66 and as ($P_3$ multiplier) pressure. As ($P_3$ actual) pressure in line 64 continues to increase, the ($P_3$ multiplier) pressure in line 66 will follow at the same rate but at a pressure one (1) p.s.i diminished so that when ($P_3$ actual) is 70, ($P_3$ multiplier) in line 66 will be 69. If a reduction in ($P_3$ actual) is now encountered, ($P_3$ actual) must reduce in pressure from 70 to 68 p.s.i before check valve 62 will release the pressure in line 66 to line 64. In this fashion our positive feedback problem is abated when the ($P_3$ acutal) signal change being transmitted from engine 20 to multiplier 18 through station 30 is below a preselected limit for ($P_3$ actual) signal changes below this preselected limit are not transmitted to multiplier 18 as ($P_3$ multiplier) pressure.

Nozzle 90 in Fig. 2 causes the efflux from piston chamber 92 to vary in response to movement of beam 44 while the influx thereto remains constant and hence causes movement of piston 94. This piston movement continues until spring 58 returns beam 44 to its null position.

It is to be understood that the invention is not limited to the specific embodiment herein illustrated and described but may be used in other ways without departure from its spirit as defined by the following claims.

We claim:

1. In a fluid control system, a fluid flow metering valve, a multiplier to position said valve, means transmitting a first signal to said multiplier, means transmitting a second signal to said multiplier, and means preventing the transmission of a change in said second signal to said multiplier when said change is below a preselected limit.

2. In a fluid control system, a fluid flow metering valve, a multiplier to position said valve, means transmitting a first signal to said multiplier, means transmitting a second signal to said multiplier, and means including back-to-back check valves in parallel preventing the transmission of a change in said second signal to said multiplier when said change is below a preselected limit.

3. In a fluid control system, a fluid flow metering valve, a multiplier to position said valve, first means transmitting a first signal to said multiplier, second means controlled as a function of said valve position and transmitting a second signal to said multiplier, and means preventing the transmission of a change in said second signal to said multiplier when said change is below a preselected limit.

4. In a fluid control system including a multiplier, first means transmitting a first signal to said multiplier, second means transmitting a second signal to said multiplier to be multiplied thereby by said first signal to produce the product thereof, said second means actuated by said product to produce said second signal, said first and second means being so connected that an increase in said first signal increases said product and an increase in said product increases said second signal to again increase said product thereby establishing a positive feedback, and means preventing the transmission of a change in said second signal to said multiplier when said change is below a preselected limit thereby minimizing the effect of said positive feedback.

5. An engine, a control system providing fuel to said engine including a fuel flow metering valve, a multiplier producing the product of two signals and positioning said valve as a function of said product thereby regulating the flow of fuel to said engine and hence the power output of said engine as a function of said product and means transmitting a first of said two signals to said multiplier, means transmitting a second of said two signals in the form of an engine power output signal to said multiplier, said engine, said control system and said second signal means connected to establish a positive feedback so that a change in said first signal changes said product in the same direction, which changes said second signal in the same direction, which changes said product again in the same direction, and means preventing the transmission of a change in said second signal to said multiplier when said change is below a preselected limit.

6. An engine in combination with a constant speed control system comprising means to meter fuel to said engine as a function of the product of two variables one of which is engine output, first means to transmit a first signal proportional to one of said two variables to said fuel metering means, second means to transmit a second signal proportional to engine output to said fuel metering means to be multiplied thereby by said first signal to produce the product of said two variables and meter fuel to said engine as a function of said product, said first and second means connected to said fuel metering means and said fuel metering means connected to said engine so that a change in said first signal causes a change in said product in the same direction, which product change causes a change in said engine output signal in the same direction, which engine output signal change causes a second increase in said product in the same direction thereby establishing a positive feedback system, and means preventing the transmission of a change in said engine output signal to said fuel metering means when said engine output signal change is below a preselected limit.

7. An engine comprising a compressor, burner and turbine in axial alignment in combination with a constant speed control system comprising means to meter fuel to said engine including a valve and means to maintain the pressure drop thereacross constant and a multiplier to control the area thereof as a function of the product of two variables indicative of engine speed error one of which variables is engine compressor discharge pressure, first means to transmit a first signal proportional to one of said two variables to said multiplier, second means to transmit a second signal proportional to engine compressor discharge pressure to said multiplier to be multiplied thereby by said first signal to produce the product of said two variables and position said valve to meter fuel to said engine as a function of said product, said first and second means connected to said fuel metering means and said fuel metering means connected to said engine so that a change in said first signal causes a change in said product in the same direction, which product change causes a change in said engine compressor discharge pressure signal in the same direction, which engine compressor discharge pressure signal change causes a second increase in said product in the same direction thereby establishing a positive feedback system, and means preventing the transmission of a change in said engine compressor discharge pressure signal to said multiplier when said engine compressor discharge pressure signal change is below a preselected limit.

8. An engine in combination with a constant speed control system comprising means to meter fuel to said engine as a function of the product of two variables one of which is indicative of engine speed error, first means to transmit a first signal proportional to engine speed error to said fuel metering means, second means to transmit a second signal to said fuel metering means to be multiplied thereby by said first signal to produce the product of said two variables and meter fuel to said engine as a function of said product, said first and second means connected to said fuel metering means and said fuel metering means connected to said engine so that a change in said first signal causes a change in said product in the same direction, which product change causes a change in said second signal in the same direction, which second signal change causes a second increase in said product in the same direction thereby establishing a positive feedback system, and means preventing the transmission of a change in said second signal to said fuel metering means when said engine output signal change is below a preselected limit.

9. An engine comprising a compressor, burner and turbine in axial alignment in combination with a constant speed control system comprising means to meter fuel to said engine including a valve and means to maintain the pressure drop thereacross constant and a force balance multiplier to control the area thereof as a function of the product of two variables indicative of engine speed error one of which variables is engine compressor discharge pressure, first means to transmit a first signal proportional to one of said two variables to said multiplier, second means to transmit a second signal proportional to engine compressor discharge pressure to said multiplier to be multiplied thereby by said first signal to produce the product of said two variables and position said valve to meter fuel to said engine as a function of said product, said first and second means connected to said fuel metering means and said fuel metering means connected to said engine so that a change in said first signal causes a change in said product in the same direction, which product change causes a change in said engine compressor discharge pressure signal in the same direction, which engine compressor discharge pressure signal change causes a second increase in said product in the same direction thereby establishing a positive feedback system, and means comprising back-to-back check valves in parallel preventing the transmission of a change in said engine compressor discharge pressure signal to said multiplier when said engine compressor discharge pressure signal change is below a preselected limit but accurately transmitting compressor discharge pressure signal changes above said preselected limit to said multiplier.

References Cited in the file of this patent

UNITED STATES PATENTS

| | | |
|---|---|---|
| 2,481,395 | Carns | Sept. 6, 1949 |
| 2,857,741 | Evers | Oct. 28, 1958 |